US008112070B2

(12) United States Patent
Huang

(10) Patent No.: US 8,112,070 B2
(45) Date of Patent: Feb. 7, 2012

(54) ELECTRONIC DEVICE AND METHOD FOR SEARCHING A MERCHANDISE LOCATION

(75) Inventor: Hao-Ming Huang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 354 days.

(21) Appl. No.: 12/541,375

(22) Filed: Aug. 14, 2009

(65) Prior Publication Data

US 2010/0105367 A1 Apr. 29, 2010

(30) Foreign Application Priority Data

Oct. 28, 2008 (CN) .......................... 2008 1 0305251

(51) Int. Cl.
*H04M 3/47* (2006.01)
(52) U.S. Cl. ..................... 455/414.1; 709/219; 715/205; 719/317
(58) Field of Classification Search ............... 455/414.1; 709/219; 715/205; 719/317
See application file for complete search history.

(56) References Cited

U.S. PATENT DOCUMENTS

| 7,519,970 B2 * | 4/2009 | Jones et al. .................... 719/317 |
| 7,624,160 B2 * | 11/2009 | Henderson et al. ........... 709/219 |
| 8,001,456 B2 * | 8/2011 | McElroy et al. .............. 715/205 |

* cited by examiner

*Primary Examiner* — William D Cumming
(74) *Attorney, Agent, or Firm* — Altis Law Group, Inc.

(57) ABSTRACT

An electronic device and method for searching a merchandise location include creating a database to store merchandise maps, and receiving the name of a searched shopping location and the merchandise name of a searched merchandise as search keywords. The electronic device and method further include downloading a merchandise map of the searched shopping location comprising the searched merchandise from the server, if the database does not have any search result, and displaying the downloaded merchandise map on a display.

18 Claims, 5 Drawing Sheets

ELECTRONIC DEVICE AND METHOD FOR SEARCHING A MERCHANDISE LOCATION

BACKGROUND

1. Technical Field

Embodiments of the present disclosure relate to searching information, and more particularly to an electronic device and method for searching a merchandise location.

2. Description of Related Art

Generally, a shopping location (e.g., a marketplace) has a vast number of merchandises. It is not easy to find needed merchandises in the shopping location, especially in an unacquainted shopping location. Thus, people have to waste unnecessary time to search where to find the needed merchandise.

What is needed, therefore, is an improved electronic device and method for searching a merchandise location conveniently.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an in EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of non-transitory computer-readable medium or other non-transitory computer storage device.

Figure 1:
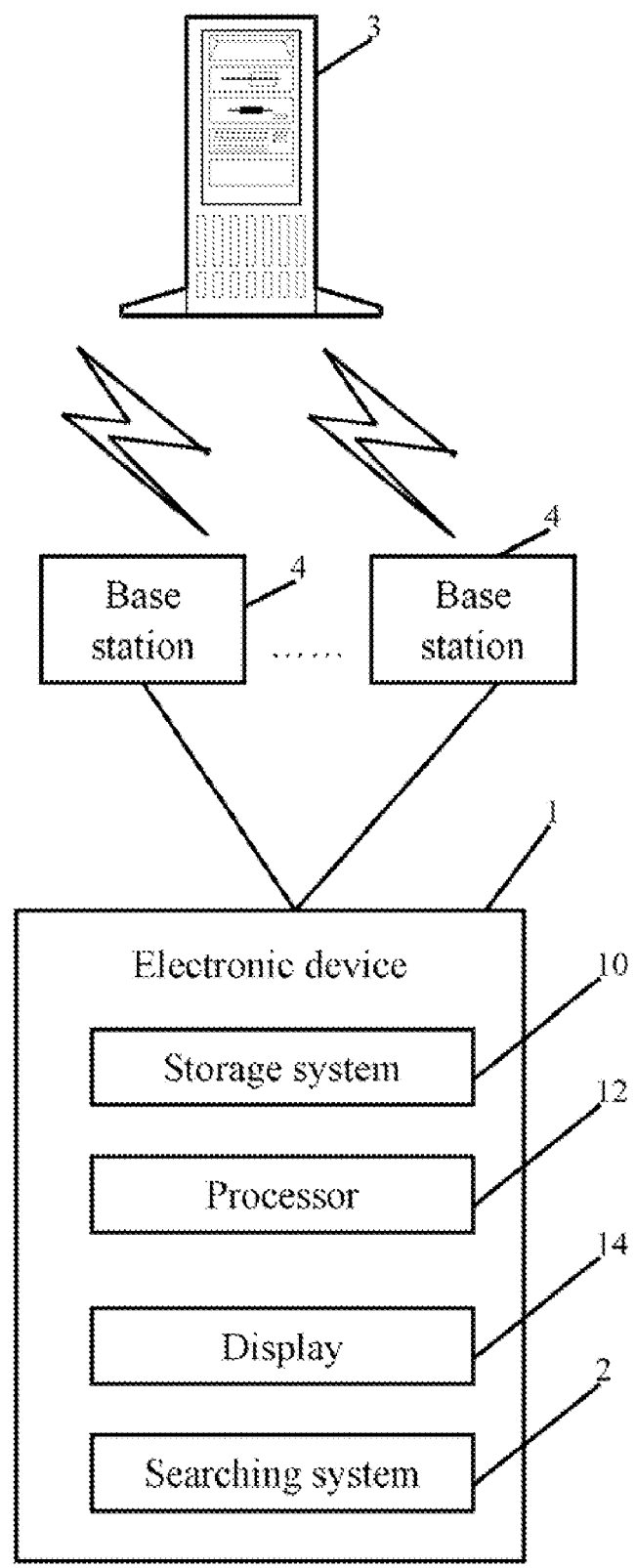
FIG. 1 is a block diagram of one embodiment of an electronic device in communication with a server through a plurality of base stations.

FIG. 1 is a block diagram of one embodiment of an electronic device 1 in communication with a server 3 through a plurality of base stations 4. The electronic device 1 may include a searching system 2. The searching system 2 may be used to determine a location of a specified merchandise in a specified shopping location (e.g., a marketplace) by searching a merchandise map of the specified shopping location. By utilizing the searching system 2, people may conveniently find needed merchandises without consuming much time in searching in a shopping location, especially in an unacquainted shopping location.

In one embodiment, the server 3 is used to provide people with various merchandise maps of different shopping locations. The server 3 may be a host computer, for example. In one embodiment, the server 3 may be a web server, which provides a website including various webpages for people to register, browse, or upload/download merchandise maps, for example. The merchandise maps may include a map showing locations of various merchandises (e.g., clothing, toys, or shoes) in a store.

The electronic device 1 may be a mobile phone, a personal digital assistant (PDA), a handheld computer, or any other kind of computing device. In the embodiment as shown in FIG. 1, the electronic device 1 may further include a storage system 10, a processor 12, and a display 14. The storage system 10 stores one or more programs, such as programs of an operating system, other applications of the electronic device 1, and various kinds of data, such as merchandise maps, location information, for example. In one embodiment, the storage system 10 may be a memory of the electronic device 1 or an external storage card, such as a memory stick, a subscriber identification module (SIM) card, a smart media card, a compact flash card, or any other type of memory card. The processor 12 executes one or more computerized operations of the electronic device 1 and other applications, to provide functions of the electronic device 1. The display 14 may display or output visible data, such as messages, images, the merchandise maps, for example.

In the embodiment of FIG. 1, the electronic device 1 may communicate with the server 3 through the plurality of base stations 4. The base stations 4 may be wireless base stations or mobile telephone base stations, for example. A user of the electronic device 1 may access the server 3 to upload/download merchandise maps through the plurality of base stations 4.

Figure 2:
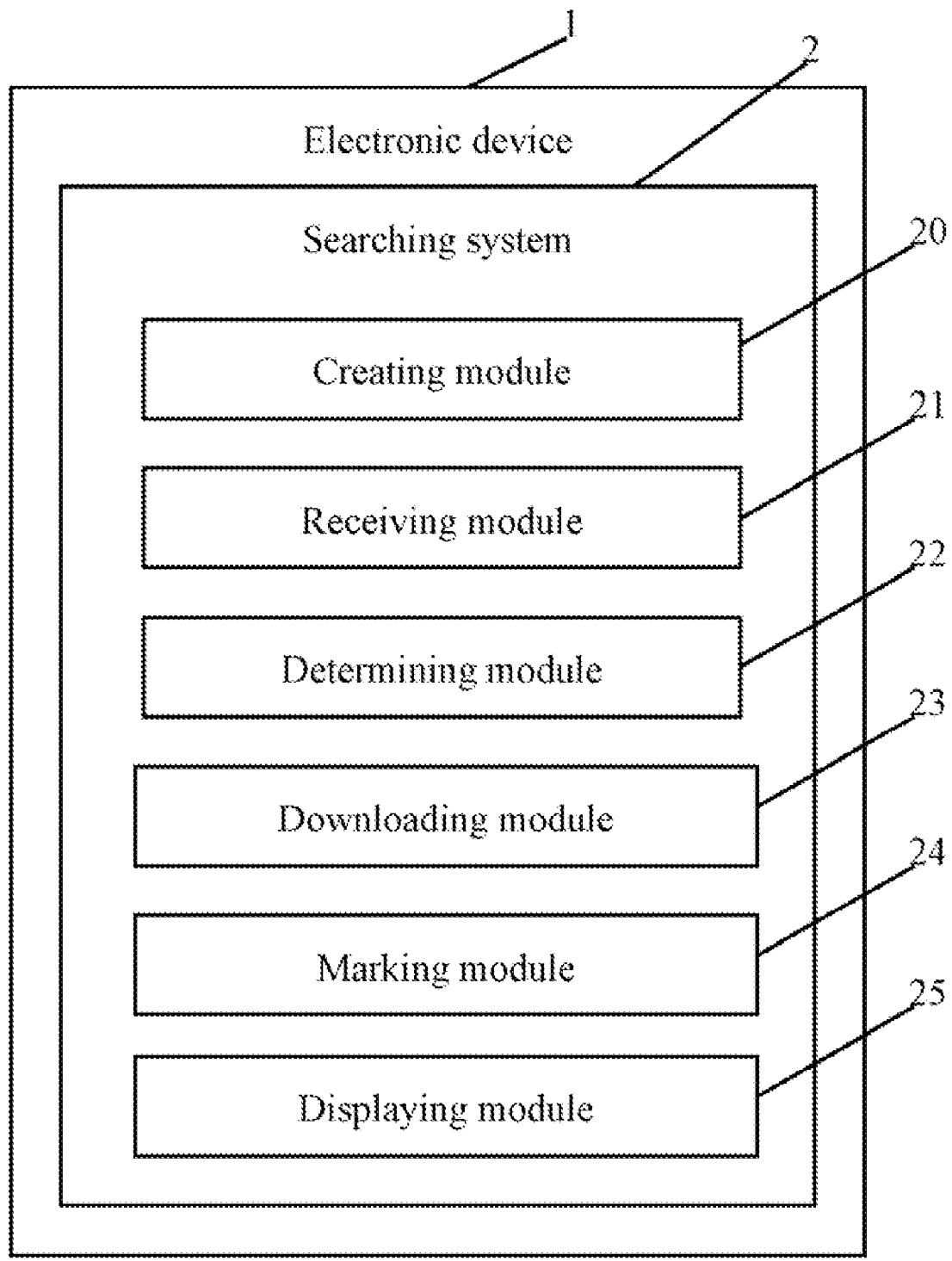
FIG. 2 is a block diagram of one embodiment of the electronic device comprising a searching system.

FIG. 2 is a block diagram of one embodiment of the electronic device 1 including the searching system 2. In one embodiment, the searching system 2 includes a creating module 20, a receiving module 21, a determining module 22, a downloading module 23, a highlighting module 24, and a displaying module 25. The modules 20, 21, 22, 23, 24, and 25 may comprise one or more computerized operations to be executed by the processor 12 to perform one or more operations of the electronic device 1, such as downloading a merchandise map from the server 3.

Figure 3:
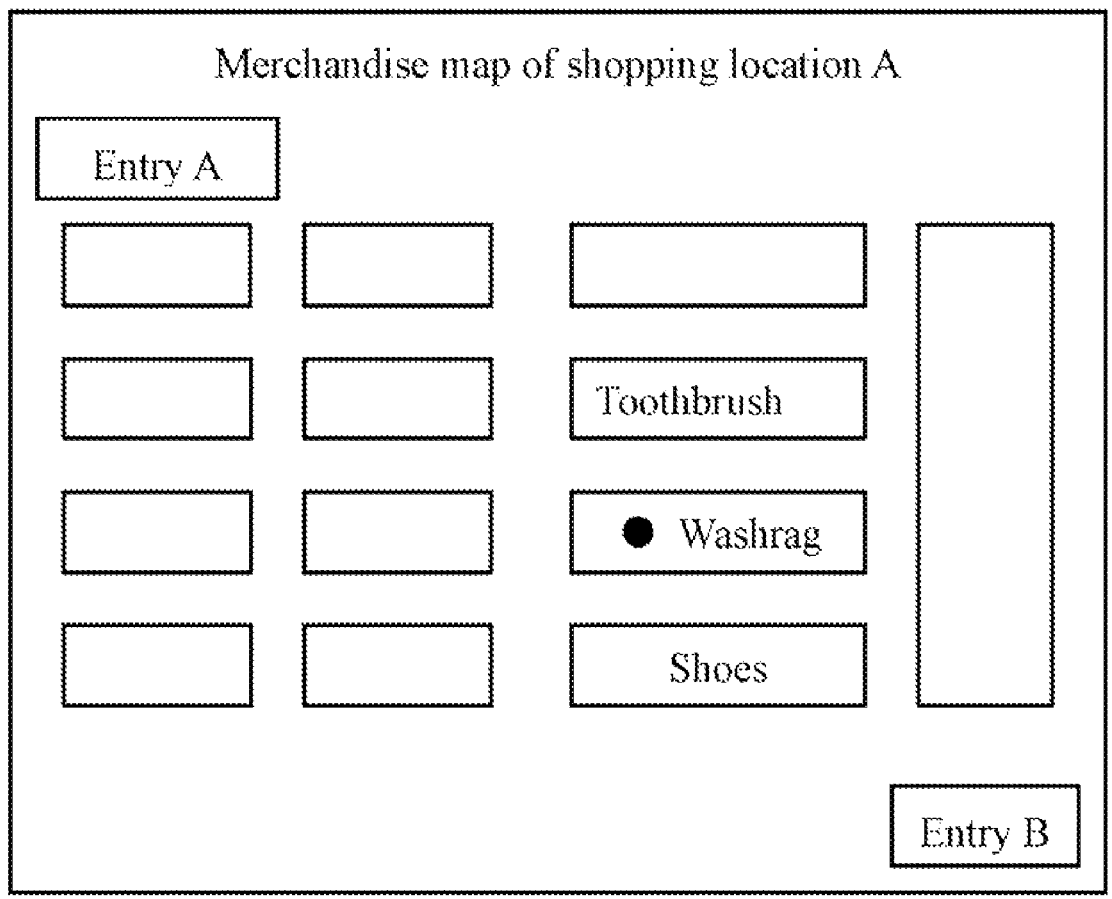
FIG. 3 is a schematic diagram of one embodiment of a merchandise map.

The creating module 20 creates a database in the storage system 10 of the electronic device 1 to store various merchandise maps of different shopping locations. Referring to FIG. 3, each of the merchandise maps may include merchandise names (e.g., washrags, toothbrushes, or shoes), merchandise distributions, and entries of a shopping location (e.g., entry A, entry B) to indicate people how to enter or leave the shopping location, for example.

The searching system 2 may provide various user interfaces for a user to input search keywords and also to browse the merchandise maps, for example. The receiving module 21 receives a name of a target shopping location and a merchandise name of a target merchandise as search keywords in response to user input.

The determining module 22 searches the database according to the search keywords, and determines if the database has a stored merchandise map of the searched shopping location including the searched merchandise from the merchandise maps in the database. For example, the determining module 22 may search the database for the stored merchandise map of the searched shopping location. If the database has the stored merchandise map of the searched shopping location, the determining module 22 determines if the stored merchandise map of the searched shopping location includes the searched merchandise.

If the database has the stored merchandise map of the searched shopping location including the searched merchandise, the highlighting module 24 highlights a location of the searched merchandise on the stored merchandise map of the searched shopping location. In one embodiment, the highlighting module 24 may highlight the location of the searched merchandise with a blinking spot, or a bright color, for example. The displaying module 25 displays the stored merchandise map of the searched shopping location with the highlighted location of the searched merchandise on the display 14 of the electronic device 1.

If the database does not have the stored merchandise map of the searched shopping location or if the stored merchandise map of the searched shopping location does not include the searched merchandise, the determining module 22 prompts that the database does not have any search result through a pop-up window/dialog box. In one embodiment, the pop-up window/dialog box may show information of "No results have been found." Then, the downloading module 23 searches the server 3 for a merchandise map of the searched shopping location including the searched merchandise according to the search keywords. If the merchandise map of the searched shopping location including the searched merchandise is found, the downloading module 26 downloads the merchandise map of the searched shopping location including the searched merchandise from the server 3.

Figure 4:
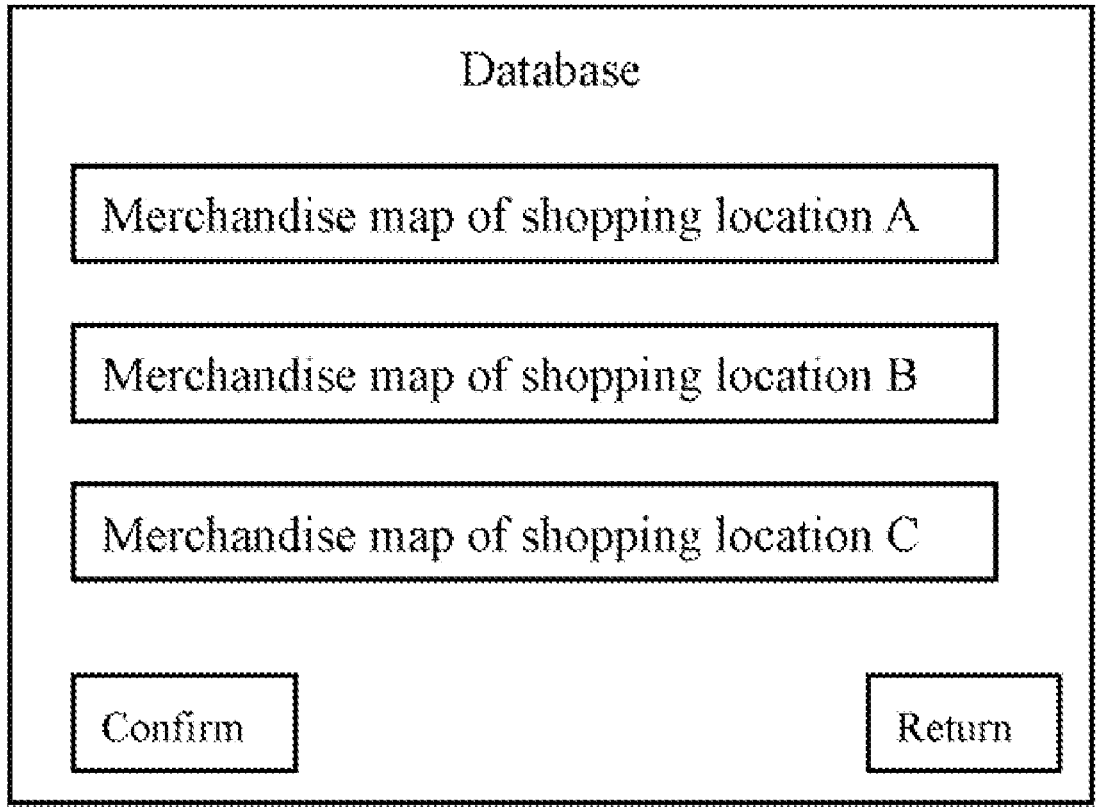
FIG. 4 is a schematic diagram of one embodiment of a database including multiple merchandise maps.
Figure 5:
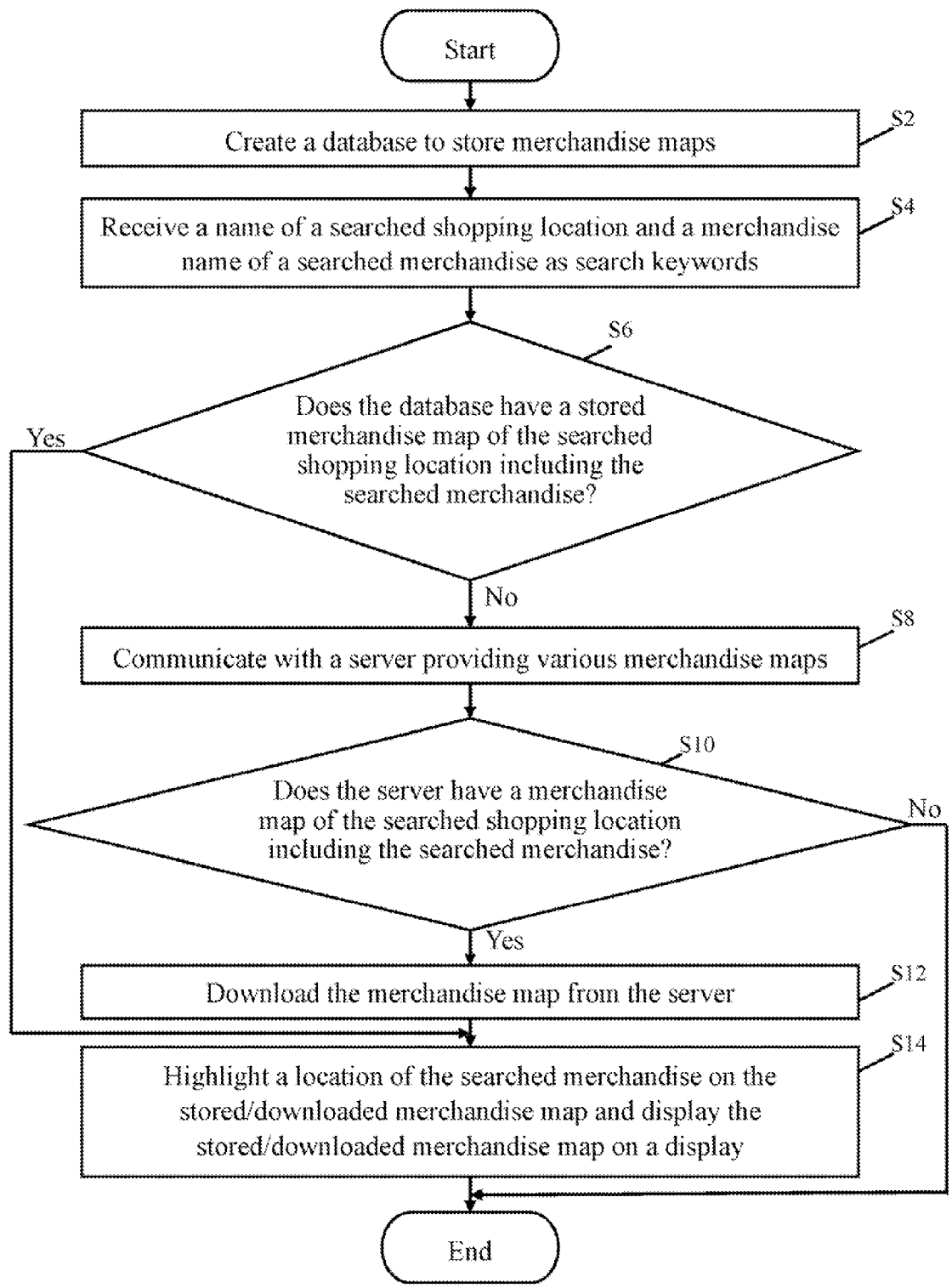
FIG. 5 is a flowchart of one embodiment of a method for searching a merchandise location by the electronic device of FIG. 1.

The downloading module 26 further stores the downloaded merchandise map into the database in the storage system 10, and names the downloaded merchandise map with the name of the shopping location. Referring to FIG. 4, there are three merchandise maps in the database: a merchandise map of shopping location A, a merchandise map of shopping location B, and a merchandise map of shopping location C.

The highlighting module 24 highlights a location of the searched merchandise on the downloaded merchandise map. The displaying module 25 displays the downloaded merchandise map with the highlighted location of the searched merchandise on the display 14.

The displaying module 25 further provides various functions to view the stored/downloaded merchandise map, such as the ability to zoom in, zoom out, and remove the stored/downloaded merchandise map, for example.

FIG. 3 is a flowchart of one embodiment of a method for searching a merchandise location by the electronic device 1. Depending on the embodiment, additional blocks may be added, others removed, and the ordering of the blocks may be replaced.

In block S2, the creating module 20 creates a database in the storage system 10 of the electronic device 1 to store various merchandise maps of different shopping locations. As mentioned above, the merchandise maps may include merchandise names (e.g., washrags, toothbrushes), merchandise distributions, entries of shopping locations to indicate people how to enter or leave the shopping locations, for example.

In block S4, the receiving module 21 receives a name of a searched shopping location and a merchandise name of a searched merchandise as search keywords in response to user input.

In block S6, the determining module 22 searches the database according to the search keywords, and determines if the database has a stored merchandise map of the searched shopping location including the searched merchandise from the merchandise maps in the database. If the database has the stored merchandise map of the searched shopping location including the searched merchandise, the procedure goes to block S14 directly.

If the database does not have any stored merchandise map of the searched shopping location including the searched merchandise, in block S8, the electronic device 1 communicates with the server 3 that provides various merchandise maps of different shopping locations through the base stations 4.

In block S10, the downloading module 26 searches the server 3 and determines if the server 3 has a merchandise map of the searched shopping location including the searched merchandise. If the server 3 does not have any merchandise map of the searched shopping location including the searched merchandise, the procedure ends.

If the server 3 has a merchandise map of the searched shopping location including the searched merchandise, in block S12, the downloading module 26 downloads the merchandise map of the searched shopping location including the searched merchandise from the server 3, and stores the downloaded merchandise map into the database in the storage system 10. The downloading module 26 may name the downloaded merchandise map with the name of the shopping location.

In block S14, the highlighting module 24 highlights a location of the searched merchandise on the stored/downloaded merchandise map of the searched shopping location, and the displaying module 25 displays the stored/downloaded merchandise map with the highlighted location of the searched merchandise on the display 14. As mentioned above, the highlighting module 24 may highlight the location of the searched merchandise with a blinking spot, or a bright color, for example.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for searching a merchandise location by an electronic device, the electronic device in communication with a server that provides merchandise maps of different shopping locations, the method comprising:

creating a database in a storage system of the electronic device to store merchandise maps;

receiving the name of a searched shopping location and the merchandise name of a searched merchandise as search keywords in response to user input;

determining if the database has a stored merchandise map of the searched shopping location comprising the searched merchandise from the merchandise maps in the database;

downloading a merchandise map of the searched shopping location comprising the searched merchandise from the server, if the database does not have the stored merchandise map comprising the searched merchandise;

highlighting a location of the searched merchandise on the downloaded merchandise map; and displaying the downloaded merchandise map with the highlighted location of the searched merchandise on a display of the electronic device.

2. The method according to claim 1, further comprising:

storing the downloaded merchandise map into the database in the storage system; and naming the downloaded merchandise map with the name of the shopping location.

3. The method according to claim 1, further comprising:
highlighting the location of the searched merchandise on the stored merchandise map if the database has the stored merchandise map comprising the searched merchandise; and
displaying the stored merchandise map with the highlighted location of the searched merchandise on the display.

4. The method according to claim 1, further comprising:
providing various functions on the display to view the downloaded merchandise map, the functions comprising the ability to zoom in, zoom out, and/or remove the downloaded merchandise map.

5. The method according to claim 1, wherein the electronic device communicates with the server through a plurality of base stations.

6. The method according to claim 5, wherein the plurality of base stations are wireless base stations or mobile telephone base stations.

7. An electronic device, the electronic device in communication with a server that provides merchandise maps of different shopping locations, the electronic device comprising:
a non-transitory storage system;
at least one processor; and
one or more programs stored in the non-transitory storage system and executed by the at least one processor, the one or more programs comprising:
a creating module operable to create a database in the non-transitory storage system to store merchandise maps;
a receiving module operable to receive the name of a searched shopping location and the merchandise name of a searched merchandise as search keywords in response to user input;
a determining module operable to determine if the database has a stored merchandise map of the searched shopping location comprising the searched merchandise from the merchandise maps in the database;
a downloading module operable to download a merchandise map of the searched shopping location comprising the searched merchandise from the server, if the database does not have the stored merchandise map comprising the searched merchandise;
a highlighting module operable to highlight a location of the searched merchandise on the downloaded merchandise map; and
a displaying module operable to display the downloaded merchandise map with the highlighted location of the searched merchandise on a display of the electronic device.

8. The electronic device according to claim 7, wherein the downloading module is further operable to store the downloaded merchandise map into the database in the non-transitory storage system, and name the downloaded merchandise map with the name of the shopping location.

9. The electronic device according to claim 7, wherein:
the highlighting module is further operable to highlight the location of the searched merchandise on the stored merchandise map if the database has the stored merchandise map comprising the searched merchandise; and
the displaying module is further operable to display the stored merchandise map with the highlighted location of the searched merchandise on the display of the electronic device.

10. The electronic device according to claim 7, wherein the displaying module is further operable to provide various functions on the display to view the downloaded merchandise map, the functions comprising the ability to zoom in, zoom out, and/or remove the downloaded merchandise map.

11. The electronic device according to claim 7, wherein the electronic device communicates with the server through a plurality of base stations.

12. The electronic device according to claim 11, wherein the plurality of base stations are wireless base stations or mobile telephone base stations.

13. A non-transitory storage medium storing a set of instructions, the set of instructions capable of being executed by a processor to perform a method for searching a merchandise location by an electronic device, the electronic device in communication with a server that provides merchandise maps of different shopping locations, the method comprising:
creating a database in a storage system of the electronic device to store merchandise maps;
receiving the name of a searched shopping location and the merchandise name of a searched merchandise as search keywords in response to user input;
determining if the database has a stored merchandise map of the searched shopping location comprising the searched merchandise from the merchandise maps in the database;
downloading a merchandise map of the searched shopping location comprising the searched merchandise from the server, if the database does not have the stored merchandise map comprising the searched merchandise;
highlighting a location of the searched merchandise on the downloaded merchandise map; and
displaying the downloaded merchandise map with the highlighted location of the searched merchandise on a display of the electronic device.

14. The non-transitory storage medium as claimed in claim 13, wherein the method further comprises:
storing the downloaded merchandise map into the database in the storage system; and
naming the downloaded merchandise map with the name of the shopping location.

15. The non-transitory storage medium as claimed in claim 13, wherein the method further comprises:
highlighting the location of the searched merchandise on the stored merchandise map if the database has the stored merchandise map comprising the searched merchandise; and
displaying the stored merchandise map with the highlighted location of the searched merchandise on the display.

16. The non-transitory storage medium as claimed in claim 13, wherein the method further comprises:
providing various functions on the display to view the downloaded merchandise map, the functions comprising the ability to zoom in, zoom out, and/or remove the downloaded merchandise map.

17. The non-transitory storage medium as claimed in claim 13, wherein electronic device communicates with the server through a plurality of base stations.

18. The non-transitory storage medium as claimed in claim 17, wherein the plurality of base stations are wireless base stations or mobile telephone base stations.

* * * * *